Dec. 15, 1964  G. BISSELL  3,160,979
FISHING LINE DEVICE
Filed April 12, 1962
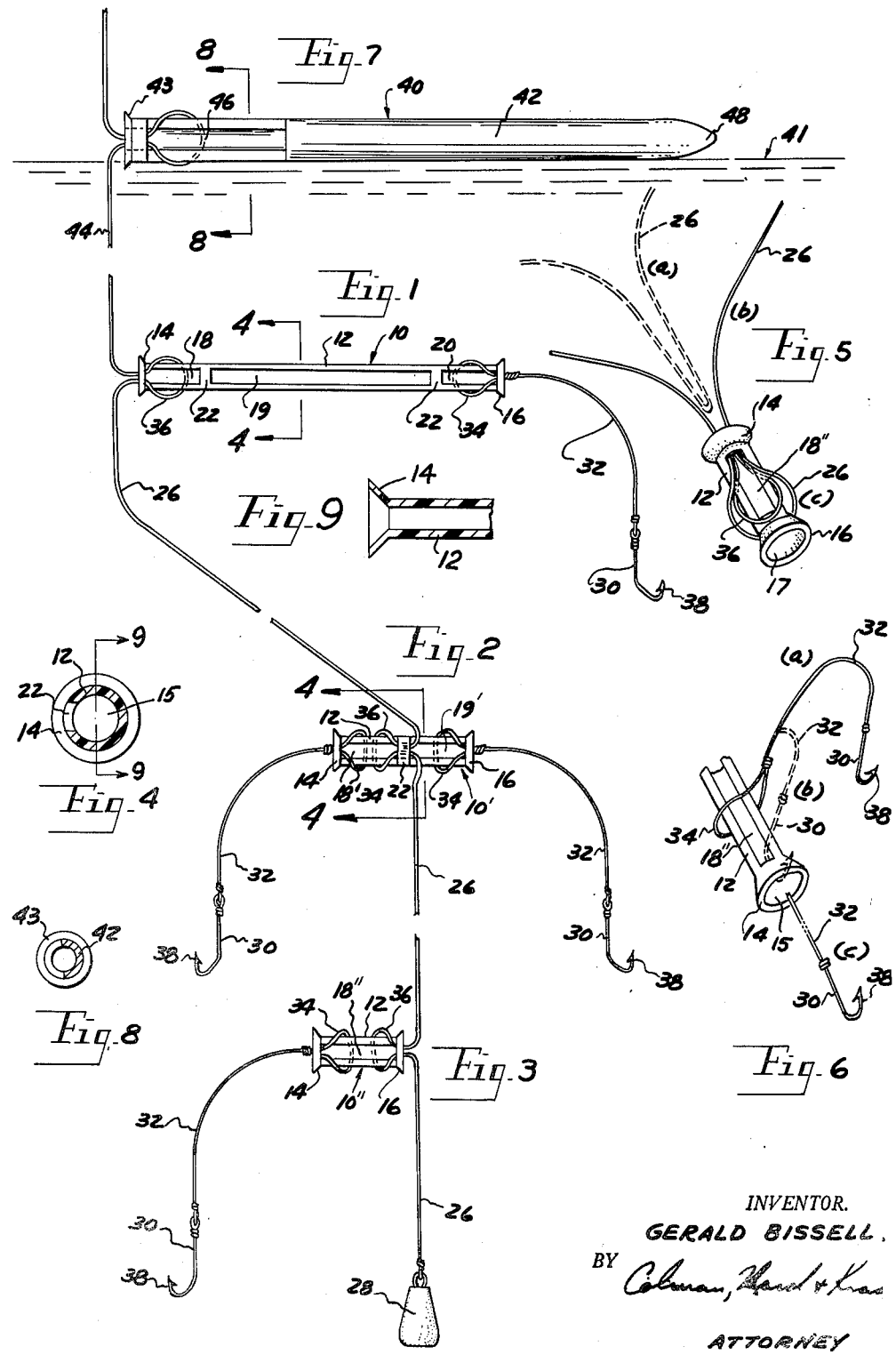
INVENTOR.
GERALD BISSELL,
BY
ATTORNEY United States Patent Office 3,160,979
Patented Dec. 15, 1964

1

3,160,979
FISHING LINE DEVICE
Gerald Bissell, 15011 Littlefield, Detroit 27, Mich.
Filed Apr. 12, 1962, Ser. No. 186,922
7 Claims. (Cl. 43—44.85)

This invention relates to fishing tackle and more particularly to a device for connecting a plurality of snelled fishing hooks or other equipment to a fishing line in such a manner as to prevent the tangling of this gear.

Bait fishing conventionally requires a fishing line of cord material having a weight or sinker attached at one end which serves to pull the end of the line to the bottom of the water in which fish are sought. A hook, upon which the bait is mounted, is permanently attached to the end of a leader or snell consisting of a short piece of nylon, plastic or cord material. The leader terminates at its other end in a closed loop which is connected to the end of the fishing line adjacent the sinker. Thus, when the sinker falls to the bottom of the water, it pulls the leader and hook with it.

However, entanglement of the hook, leader, sinker and line frequently occurs as a result of movement of the gear during the fishing operation. This may occur in several different ways. For example, as the hook and leader are of relatively little weight, they tend to be buoyant and to rise and fall adjacent the sinker under the influence of underwater eddies and currents. In addition, the repeated withdrawal and replacement of the fishing line with respect to the water for purposes of inspecting the bait and removing fish from the line tends to cause the hook and leader to move about the sinker in a random fashion. Also, entangling the hook or the line in weeds, or actually hooking a fish may cause rapid or violent movement of the line, sinker and hook. As a result of these various movements, the leader and hook often become tangled with the sinker and fishing line, with a resultant annoyance and delay to the fisherman.

The problem is further accentuated when a plurality of hooks are employed. The leaders of the various hooks must either be all attached at a single point on the end of the line or else they may be connected at different points along its length. In either case, the proximity of the various leaders and hooks to the line and to each other substantially increase their possibility of entanglement.

The present invention contemplates a device which reduces the possibility of snarling by suspending the leader and hook from a point displaced from the axis of the line. In addition, it forms a support for the leader adjacent the loop whereby the leader is positioned so as to extend in the direction away from the line.

This is accomplished by utilizing a hollow tube of plastic or other similar material having flared ends at which the inner diameter is greater than the inner diameter along the central portion of the tube. An aperture in the wall of the tube intermediate of the ends connects to the central passage.

The tube is mounted on the line by selecting a point along the length of the line, pushing it through one of the flared ends, pulling the loop thus formed through the slot and over the opposite end of the tube so as to be positioned about the outer surface of the wall of the tube opposite to the slot. When the line is pulled taut, the loop is drawn tightly about the outside of the tube, thus maintaining the tube in a position perpendicular to the extension of the line.

The hook and leader are mounted on the tube by slipping the loop in the leader over the free end of the tube with the hook extending outwards directly opposite the slot. The loop is moved to a position adjacent the other end of the tube and the hook slipped into the slot and out

2 the free flared end. The hook and leader are pulled taut in the direction away from the line with the result that the loop is drawn tightly about the tube in a fashion similar to the connection between the tube and the line.

In this fashion, the flared ends of the tube perform several functions. When the line or leader is pulled taut around the tube, the flared end prevents the outermost part of the loop from slipping around the end of the tube adjacent the line or the leader and resulting in an unnecessary knot.

In addition, the flared end serves as additional bearing surface in maintaining the tube in a position perpendicular to the line. Also, when the hook is passed through the slot and out the end of the tube, the flared end allows the main portion of the tube to be of small diameter and still permit the hook to be passed through.

In several embodiments of the present invention, which will be subsequently described in detail, the tubes are constructed of various lengths and often with more than one slot in each tube. Use of several smaller slots results in a sturdier tube and allows the line to be connected to the center of the tube while separate hooks and leaders are connected at each end, extending away from the line.

The present device may also be employed to attach other apparatus to the fishing line such as sinkers, floats and lures. One embodiment which will be described subsequently in detail incorporates the slotted tubular construction directly into the body of a float for ease of mounting the float on the line.

The present invention therefore has application to situations in which two or more lines need be interconnected with a minimum of snarling. In addition, it has application to devices or equipment which must be mounted along the length of a line.

Another advantage of the present invention is that it allows two or more lines, or a single line and equipment, to be connected without cutting the line and without the tying of knots which would be tedious to undo. The result is considerable ease of assembly and disassembly and substantial savings in time.

Further advantages of the present device include simplicity, economical construction, and wide application of use.

Other objects and advantages will be more readily apparent from the following detailed description wherein are disclosed several preferred embodiments of the present invention. The description makes reference to the drawings in which:

FIG. 1 is an elevational view of a first preferred embodiment of the present invention;

FIG. 2 is an elevational view of a second preferred embodiment of the present invention;

FIG. 3 is an elevational view of a third preferred embodiment of the present invention;

FIG. 4 is a sectional view taken along the line 4—4 in FIGS. 1 and 2;

FIG. 5 is a perspective view of the embodiment illustrated in FIG. 3 showing the steps necessary to mount the present device on the line;

FIG. 6 is a perspective view of the embodiment illustrated in FIG. 3 showing the steps necessary to connect a leader and hook to the present device;

FIG. 7 is an elevational view of another embodiment of the present invention as incorporated in a fishing float;

FIG. 8 is a sectional view taken along the line 8—8 in FIG. 7; and

FIGURE 9 is a sectional view taken along the line 9—9 in FIGURE 4.

Referring to the drawings in detail, the present invention is illustrated as comprising a hollow tube 10 having a central portion 12 of constant diameter, and flanges or flared sections 14 and 16 at the ends of the tube of a larger diameter than that of the central portion defining apertures 15 and 17.

In FIGS. 1, 2 and 3, slots 18, 19 and 20 extend along the walls of the central portion 12 of the tube 10. The slots are separated by a short section of the wall 22. The number of slots utilized will depend upon the way the particular device is to be mounted upon a fishing line 26. If the line 26 is connected to the tube 10' along its central portion 12, as shown in FIG. 2, the short section of wall 22 is necessary for proper connection and therefore at least two slots are necessary. Alternatively, a single slot or a plurality of slots may be utilized, as illustrated in FIGS. 1 and 3.

As shown in FIG. 3, a sinker 28 is connected to the end of the line 26. The hooks 30 are permanently mounted each at the end of a leader 32 which terminates at its opposite end in a closed loop 34.

As shown in FIG. 5, the tube 10 is mounted on the line 26 by pushing the line, at the desired point, through a flared end 14 (at a) of the tube and pulling the resulting loop 36 through the adjacent slot 18'' (at b) and out of the tube. The loop 36 is then pulled to the opposite end of the tube 10 and over that end so that the loop 36 encircles the tube (at c). The line 26 is then pulled taut with the result that the loop 36 is drawn close to the first end of the tube adjacent the line. The flared end 14 then prevents the loop 36 from slipping over the end of the tube.

If the line is attached to the tube 10' at the central portion 12 of the tube, as shown in FIG. 2, the procedure is the same except that the line 26 is pushed under the short section of wall 22 which separates the slots 18' and 19' rather than through one of the flared ends 14 or 16.

The tube 10 is removed from the line 26 simply by reversing the steps outlined above and pulling the resulting loop 36 out of the flared end 14 or 16 or back under the short wall section 22.

The hook 30 and leader 32 may be connected to the tube 10 in a manner similar to that just described provided that the tube has not as yet been attached to the line 26. Ordinarily, however, the tube would be first connected to the line and then the snelled hook 30 would be connected to the opposite end of the tube in a manner as illustrated in FIG. 6.

The loop 34 is passed (at a in FIG. 6) about the free end 14 of the tube 10 with the leader 32 extending away from the tube directly opposite the slot 18''. The barbed or pointed end 38 of the hook 30 is inserted (at b) in the slot 18'' so as to extend out of the flared end 14. The hook 30 is then rotated and advanced so as to be passed (at c) through the flared end 14 of the tube 10. The hook 30 and leader 32 are then pulled tightly in the direction opposite to the tube 10 so as to draw the loop 34 taut about the outer surface of the tube.

As shown in FIGS. 1, 2 and 3, a plurality of tubes 10 may be connected along the length of the line 26 to provide for a plurality of snelled hooks 30. In addition, snelled hooks 30 may be connected at opposite ends of the same tube 10 when the tube is connected to the line along its central portion 12 as shown in FIG. 2.

FIG. 7 illustrates a float 40 which incorporates the connecting principle of the present invention. The float is utilized on a fishing line as a visual aid for the fisherman in determining whether a fish is pulling at the bait on the hook below. As such it must be connected directly to the fishing line and must float along the surface of the water 41.

This is accomplished by constructing the float body 42 of wood or other bouyant material. The float is hollow at one end 43, which is flared adjacent the fishing line 44. A slot 46 extends through the body wall adjacent this end. The float 40 is mounted on the line 44 by inserting the line through the open flared end 43, and pulling it up through the slot 46 and around the opposite end of the float 48 in a manner similar to that shown in FIG. 5.

Having thus described my invention, I claim:

1. A device for attachment to a line, comprising:
 a cylindrical member having a central passage extending along and throughout its length;
 flared sections at each end of said member at which the inner diameter is greater than the inner diameter of the central passage and the outer diameter is greater than the central outer diameter of said member;
 and said cylindrical member defining only a single elongated aperture in the wall of said member intermediate of said flared sections communicating with said central passage, whereby a line may be attached to one end of said member by pushing a loop of said line through one of said flared sections, along said passage, through said aperture and over the opposite end of said member.

2. A device for attachment to a line, comprising:
 an elongated member having a central passage at each end;
 said member defining a pair of first apertures each extending through an end of said member communicating with said passages, and each having a diameter greater than that of said central passages;
 flared sections at each end of said member at which the outer diameter is greater than the central outer diameter of said member;
 said member defining only a single aperture in the wall of said member intermediate of said flared sections communicating with said central passages, whereby a line may be attached to one end of said member by pushing a loop of said line through one of said first apertures, along the adjacent passage, through said single wall aperture and over the opposite end of said member.

3. A device for attaching fishing line to the closed looped end of a leader, said leader having a hook connected to the outer end thereof, comprising:
 a cylindrical member having a central passage extending along its length;
 flared sections at each end of said member at which the inner diameter is greater than the inner diameter of the central passage and the outer diameter is greater than the central outer diameter of said member;
 said cylindrical member defining only a single aperture in the wall of said member intermediate of said flared sections communicating with said central passage, whereby said line may be attached to one end of said member by pushing a loop of said line through one of said flared sections, along said passage, through said single aperture and over the opposite end of said member, and whereby said leader may be attached to the other end of said member by passing said loop about said last end, and pushing said hook into said single aperture.

4. A fishing assembly of the type described, comprising:
 a fishing line;
 a cylindrical member having a central passage extending along and throughout its length;
 flared sections at each end of said member at which the inner diameter is greater than the inner diameter of the central passage and the outer diameter is greater than the central outer diameter of said member;
 said cylindrical member defining an elongated aperture in the wall of said member intermediate of said flared sections communicating with said central passage, whereby said line may be attached to one end of said member by pushing a loop of said line through one of said flared sections, along said passage, through said aperture and over the opposite end of said member.

5. A fishing assembly of the type described, comprising:
a fishing line;
a cylindrical member having a central passage extending along and throughout its length;
flared sections at each end of said member at which the inner diameter is greater than the inner diameter of the central passage and the outer diameter is greater than the central outer diameter of said member;
said cylindrical member defining an elongated aperture adjacent each flared section in the wall of said member intermediate of said flared sections and communicating with said central passage, said member having a central wall portion between said apertures whereby said line may be attached to said member by pushing a loop of said line through a first of said apertures, along said passage, and beneath said wall portion, out through the second aperture and over the end of said member.

6. A fishing assembly of the type described, comprising:
a fishing line;
an elongated member having a central passage at each end;
said member defining a pair of first apertures each extending through an end of said member communicating with said passages, and each having a diameter greater than that of said central passages;
flared sections at each end of said member at which the outer diameter is greater than the central outer diameter of said member;
said member defining a second aperture in the wall of said member intermediate of said flared sections communicating with said central passages, whereby said line may be attached to one end of said member by pushing a loop of said line through one of said first apertures, along the adjacent passage, through said second aperture and over the opposite end of said member.

7. A fishing assembly of the type described, comprising:
a fishing line;
a snelled hook having a loop at one end over its snelled portion;
a cylindrical member having a central passage extending along its length;
flared sections at each end of said member, at which the inner diameter is greater than the inner diameter of the central passage and the outer diameter is greater than the central outer diameter of said member;
said cylindrical member defining an aperture in the wall of said member intermediate of said flared sections communicating with said central passage, whereby said line may be attached to one end of said member by pushing a loop of said line through one of said flared sections, along said passage, through said aperture and over the opposite end of said member, and whereby said snelled hook may be attached to the other end of said member by passing the loop on said snelled portion about said last end, and pushing said hook into said aperture, along said passage, and through the adjacent flared section.

References Cited in the file of this patent
UNITED STATES PATENTS

| | | |
|---|---|---|
| 473,503 | Herring | Apr. 26, 1892 |
| 1,112,049 | Anthony | Sept. 29, 1914 |
| 1,153,053 | Forster | Sept. 7, 1915 |
| 2,269,615 | Walker | Jan. 13, 1942 |
| 2,935,810 | Giguere | May 10, 1960 |

FOREIGN PATENTS

| | | |
|---|---|---|
| 613,008 | France | Aug. 13, 1926 |
| 517,249 | Great Britain | Jan. 24, 1940 |